United States Patent
Moulieres et al.

(10) Patent No.: US 10,316,721 B1
(45) Date of Patent: Jun. 11, 2019

(54) HIGH EFFICIENCY MIXER FOR VEHICLE EXHAUST SYSTEM

(71) Applicant: Faurecia Emissions Control Technologies, USA, LLC, Columbus, IN (US)

(72) Inventors: Julien Moulieres, Montbéliard (FR); Eduardo Alano, Columbus, IN (US); Laurent Poinsot, Montbéliard (FR)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 15/959,515

(22) Filed: Apr. 23, 2018

(51) Int. Cl.
*F01N 3/20* (2006.01)
*F01N 3/10* (2006.01)
*B01D 53/94* (2006.01)
*B01F 5/04* (2006.01)
*B01F 5/06* (2006.01)
(Continued)

(52) U.S. Cl.
CPC ......... *F01N 3/208* (2013.01); *B01D 46/0027* (2013.01); *B01D 53/944* (2013.01); *B01D 53/9418* (2013.01); *B01D 53/9431* (2013.01); *B01D 53/9477* (2013.01); *B01F 3/04049* (2013.01); *B01F 5/0473* (2013.01); *B01F 5/0606* (2013.01); *B01F 5/0688* (2013.01); *F01N 3/021* (2013.01); *F01N 3/106* (2013.01); *B01D 2279/30* (2013.01);
(Continued)

(58) Field of Classification Search
None
See application file for complete search history.

(56) References Cited

U.S. PATENT DOCUMENTS

| 4,033,123 A | 7/1977 | Masaki et al. |
| 4,459,805 A | 7/1984 | Kamiya et al. |

(Continued)

FOREIGN PATENT DOCUMENTS

| CN | 202012386 U | 10/2011 |
| CN | 103321724 A | 9/2013 |

(Continued)

OTHER PUBLICATIONS

Haas et al. (WO2017/178094A1)—translated document (Year: 2017).*

(Continued)

*Primary Examiner* — Walter D. Griffin
*Assistant Examiner* — Jelitza M Perez
(74) *Attorney, Agent, or Firm* — Carlson, Gaskey & Olds, P.C.

(57) ABSTRACT

A vehicle exhaust system includes an inlet module configured to receive engine exhaust gas and a mixer housing defining an internal cavity that receives engine exhaust gas from the inlet module. An injection component is positioned within the internal cavity and has a fluid inlet and a fluid outlet to direct injected fluid into the internal cavity to mix with the engine exhaust gas. The injection component defines an injection axis and includes an inner structure defining an inner gas flow path and an outer structure defining an outer gas flow path that is between the inner and outer structures and radially outward of the inner gas flow path to improve mixing at the fluid outlet. An outlet module is configured to direct a mixture of engine exhaust gas and fluid to a downstream exhaust component.

25 Claims, 12 Drawing Sheets

(51) Int. Cl.
*B01F 3/04* (2006.01)
*B01D 46/00* (2006.01)
*F01N 3/021* (2006.01)
*B01F 5/00* (2006.01)

(52) U.S. Cl.
CPC ... *B01F 2005/0017* (2013.01); *F01N 2610/02* (2013.01); *F01N 2610/08* (2013.01); *F01N 2610/1406* (2013.01)

(56) References Cited

U.S. PATENT DOCUMENTS

| | | |
|---|---|---|
| 4,662,172 A | 5/1987 | Shinzawa et al. |
| 4,912,920 A | 4/1990 | Hirabayashi |
| 5,020,991 A | 6/1991 | Schaale et al. |
| 5,826,428 A | 10/1998 | Blaschke |
| 6,192,677 B1 | 2/2001 | Tost |
| 6,382,600 B1 | 5/2002 | Mahr |
| 6,401,455 B1 | 6/2002 | Mathes et al. |
| 6,449,947 B1 | 9/2002 | Liu et al. |
| 6,527,865 B1 | 3/2003 | Sajoto et al. |
| 6,539,708 B1 | 4/2003 | Hofmann et al. |
| 7,059,118 B2 | 6/2006 | Ripper et al. |
| 7,849,676 B2 | 12/2010 | Witte-Merl |
| 7,877,983 B2 | 2/2011 | Kunkel et al. |
| 7,878,298 B2 | 2/2011 | Winter et al. |
| 7,963,104 B2 | 6/2011 | Girard et al. |
| 7,980,063 B2 | 7/2011 | Cooke |
| 8,097,055 B2 | 1/2012 | Staley et al. |
| 8,114,364 B2 | 2/2012 | Harinath et al. |
| 8,375,703 B2 | 2/2013 | Hayashi et al. |
| 8,438,839 B2 | 5/2013 | Floyd et al. |
| 8,539,761 B2 | 9/2013 | Lebas et al. |
| 8,646,258 B2 | 2/2014 | Vanvolsem et al. |
| 8,756,921 B2 | 6/2014 | Troxler et al. |
| 8,776,509 B2 | 7/2014 | Wikaryasz et al. |
| 8,966,884 B2 | 3/2015 | Kruse et al. |
| 9,057,312 B2 | 6/2015 | Munnannur et al. |
| 9,062,582 B2 | 6/2015 | Loman et al. |
| 9,103,258 B2 | 8/2015 | Norling et al. |
| 9,140,163 B2 | 9/2015 | Loman |
| 9,266,075 B2 | 2/2016 | Chapman et al. |
| 9,341,100 B2 | 5/2016 | Petry |
| 9,346,017 B2 | 5/2016 | Greber |
| 9,464,546 B2 | 10/2016 | Perrot et al. |
| 9,581,067 B2 | 2/2017 | Guilbaud et al. |
| 9,719,397 B2 | 8/2017 | Alano et al. |
| 9,873,084 B2 | 1/2018 | Lee et al. |
| 2001/0018826 A1 | 9/2001 | Rusch |
| 2004/0047232 A1 | 3/2004 | Terentiev |
| 2005/0150211 A1 | 7/2005 | Crawley et al. |
| 2007/0163241 A1 | 7/2007 | Meingast et al. |
| 2007/0175204 A1 | 8/2007 | Shirai et al. |
| 2009/0031714 A1 | 2/2009 | Jochumsen et al. |
| 2009/0064668 A1 | 3/2009 | Herrick et al. |
| 2009/0084094 A1 | 4/2009 | Goss et al. |
| 2009/0107126 A1 | 4/2009 | Bugos et al. |
| 2009/0249769 A1 | 10/2009 | Flanagan et al. |
| 2010/0199645 A1 | 8/2010 | Telford |
| 2010/0212292 A1 | 8/2010 | Rusch et al. |
| 2010/0212301 A1 | 8/2010 | De Rudder et al. |
| 2010/0257849 A1 | 10/2010 | Kowada |
| 2010/0300080 A1 | 12/2010 | Peters et al. |
| 2010/0307138 A1 | 12/2010 | Chen |
| 2010/0319329 A1 | 12/2010 | Khadiya |
| 2011/0094206 A1 | 4/2011 | Liu et al. |
| 2011/0131958 A1 | 6/2011 | Adelman et al. |
| 2011/0162347 A1 | 7/2011 | Katare et al. |
| 2011/0239631 A1 | 10/2011 | Bui et al. |
| 2011/0308234 A1 | 12/2011 | De Rudder et al. |
| 2012/0144812 A1 | 6/2012 | Hyun |
| 2012/0204541 A1 | 8/2012 | Li et al. |
| 2012/0216513 A1 | 8/2012 | Greber et al. |
| 2013/0216442 A1 | 8/2013 | Brunel et al. |
| 2013/0263575 A1 | 10/2013 | Sun |
| 2013/0291519 A1 | 11/2013 | Patel et al. |
| 2013/0303365 A1 | 11/2013 | Yin et al. |
| 2014/0086802 A1 | 3/2014 | Werni et al. |
| 2014/0318112 A1 | 10/2014 | Solbrig et al. |
| 2014/0334988 A1 | 11/2014 | Stanavich et al. |
| 2014/0345257 A1 | 11/2014 | Levin et al. |
| 2015/0071828 A1 | 3/2015 | Sampath et al. |
| 2015/0152766 A1 | 6/2015 | Brunel |
| 2015/0167520 A1 | 6/2015 | Niaz |
| 2015/0273411 A1 | 10/2015 | Chapman et al. |
| 2016/0069239 A1* | 3/2016 | Freeman ............... F01N 3/2066 60/324 |
| 2016/0084133 A1 | 3/2016 | Sampath et al. |
| 2016/0115847 A1 | 4/2016 | Chapman et al. |
| 2016/0138454 A1 | 5/2016 | Alano et al. |
| 2016/0215673 A1* | 7/2016 | Noren, IV ............ F01N 3/2892 |
| 2016/0251990 A1 | 9/2016 | Dimpelfeld et al. |
| 2016/0317986 A1 | 11/2016 | Alano |
| 2016/0319720 A1 | 11/2016 | Alano |
| 2016/0319723 A1 | 11/2016 | Alano et al. |
| 2016/0319724 A1 | 11/2016 | Alano et al. |
| 2016/0332126 A1 | 11/2016 | Nande et al. |
| 2017/0022870 A1 | 1/2017 | Chapman et al. |
| 2017/0066012 A1 | 3/2017 | Hornback et al. |
| 2017/0082007 A1 | 3/2017 | Alano et al. |
| 2017/0107877 A1 | 4/2017 | Johnson et al. |
| 2017/0167344 A1 | 6/2017 | Alano et al. |

FOREIGN PATENT DOCUMENTS

| | | |
|---|---|---|
| CN | 203452874 U | 2/2014 |
| CN | 104594990 A | 5/2015 |
| CN | 104832255 A | 8/2015 |
| CN | 104832256 A | 8/2015 |
| CN | 204646380 U | 9/2015 |
| CN | 204646381 U | 9/2015 |
| CN | 205164443 U | 4/2016 |
| CN | 106014560 A | 10/2016 |
| CN | 205627632 U | 10/2016 |
| CN | 107084028 A | 8/2017 |
| CN | 206487537 U | 9/2017 |
| DE | 102007034316 A1 | 1/2009 |
| DE | 102007051510 A1 | 4/2009 |
| DE | 102008008564 A1 | 8/2009 |
| DE | 102011077156 A1 | 12/2012 |
| DE | 102012209689 A1 | 12/2013 |
| DE | 102011075594 A1 | 9/2016 |
| EP | 1596044 A1 | 11/2005 |
| EP | 2492465 A1 | 1/2012 |
| EP | 2551481 A1 | 6/2012 |
| FR | 2910533 A1 | 6/2008 |
| FR | 3007068 A3 | 12/2014 |
| GB | 174131 A | 1/1922 |
| GB | 1215148 A | 12/1970 |
| JP | H04365303 A | 12/1992 |
| JP | H11159320 A | 6/1999 |
| JP | 2001030093 A | 2/2001 |
| JP | 2004339991 A | 12/2004 |
| JP | 2005214175 A | 8/2005 |
| JP | 2006017043 A | 1/2006 |
| JP | 2006167576 A | 6/2006 |
| JP | 5066435 B2 | 11/2012 |
| JP | 2016075205 A | 5/2016 |
| JP | 2016188579 A | 11/2016 |
| KR | 20090105593 A | 10/2009 |
| KR | 102011049152 A | 5/2011 |
| KR | 1020120053494 A | 5/2011 |
| KR | 20140002326 A | 1/2014 |
| WO | 2004113690 A1 | 12/2004 |
| WO | 2009098096 A1 | 8/2009 |
| WO | 2009127449 A1 | 10/2009 |
| WO | 2011110885 A1 | 9/2011 |
| WO | 2013004517 A2 | 1/2013 |
| WO | 2013010700 A1 | 1/2013 |
| WO | PCT/US2013/051935 | 7/2013 |
| WO | PCT/US14/10989 | 1/2014 |
| WO | PCT/US14/15241 | 2/2014 |
| WO | 2014098728 A1 | 6/2014 |
| WO | PCT/US14/40588 | 6/2014 |

(56) References Cited

FOREIGN PATENT DOCUMENTS

| WO | PCT/US14/41013 | | 6/2014 | |
|----|----|----|----|----|
| WO | 2015018849 A1 | | 2/2015 | |
| WO | 2016036298 A1 | | 3/2016 | |
| WO | 2016158993 A1 | | 10/2016 | |
| WO | 2016180244 A1 | | 11/2016 | |
| WO | 2016207484 A1 | | 12/2016 | |
| WO | PCT/US2017/035130 | | 5/2017 | |
| WO | PCT/US17/49805 | | 9/2017 | |
| WO | WO-2017178094 A1 | * | 10/2017 | ........... F01N 3/2066 |
| WO | PCT/US17/59874 | | 11/2017 | |
| WO | PCT/US18/12865 | | 1/2018 | |

OTHER PUBLICATIONS

Proventia Emisson Control Oy, Proventia SuperTornado, Urea Mixing Technology, 2016.
International Preliminary Report on Patentability for PCT Application No. PCT/US2012/057693, dated Apr. 9, 2015.
International Preliminary Report on Patentability for PCT Application No. PCT/US2012/057768, dated Apr. 9, 2015.
International Search Report and Written Opinion for PCT Application No. PCT/US2017/049805, dated Jan. 29, 2018.
International Search Report and Written Opinion for PCT Application No. PCT/US2017/035130, dated Feb. 22, 2018.
International Search Report and Written Opinion for PCT Application No. PCT/US2014/010989, dated Oct. 15, 2014.
International Search Report and Written Opinion for International Application No. PCT/US2016/028229 dated Jul. 28, 2016.
International Search Report and Written Opinion for International Application No. PCT/US2016/028237 dated Jul. 28, 2016.
International Preliminary Report on Patentability for International Application No. PCT/US2014/015241 dated Aug. 18, 2016.
International Search Report and Written Opinion for International Application No. PCT/US2014/041013 dated Feb. 15, 2015.
International Search Report and Written Opinion for PCT Application No. PCT/US2014/040588, dated Feb. 6, 2015.

* cited by examiner

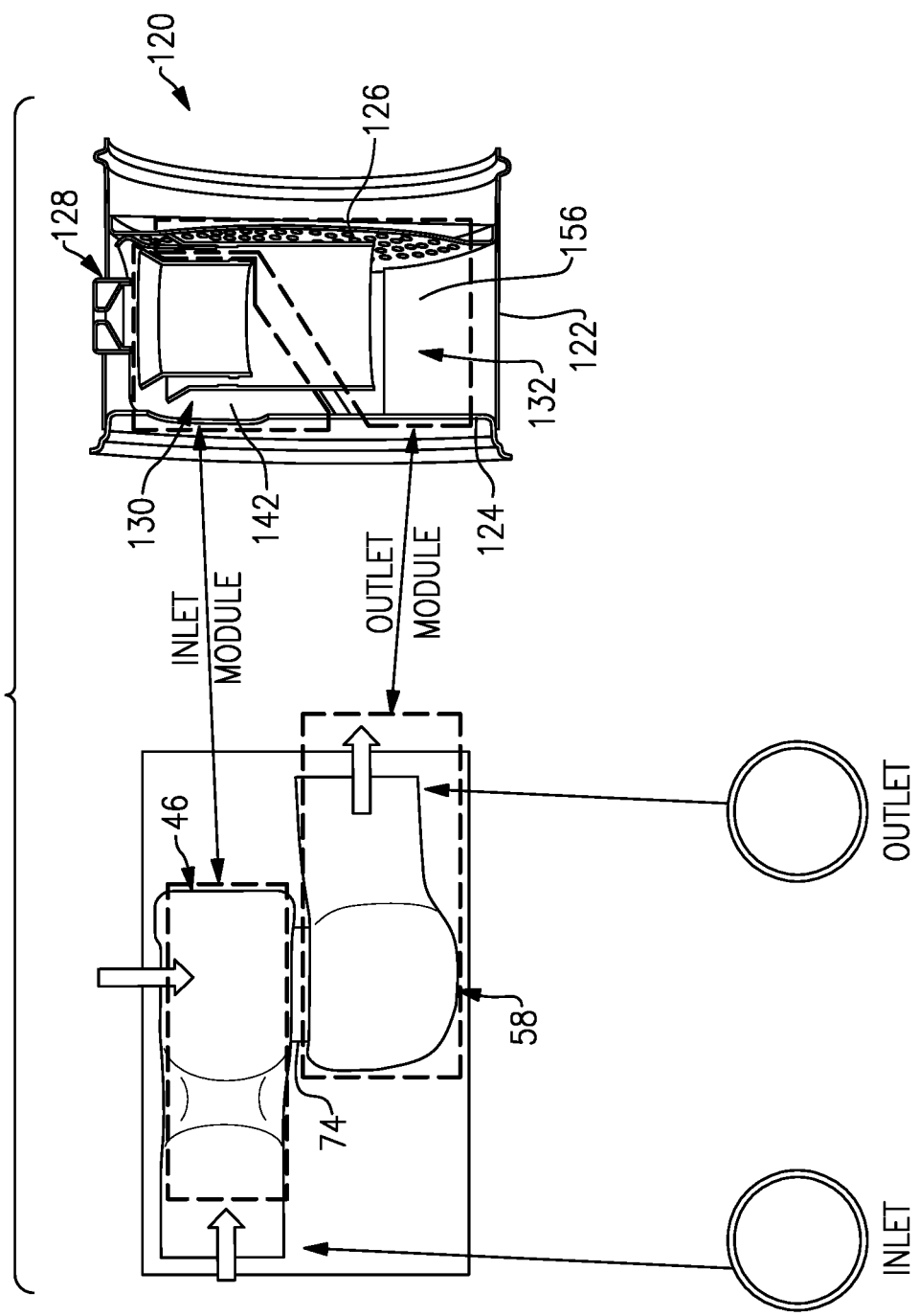

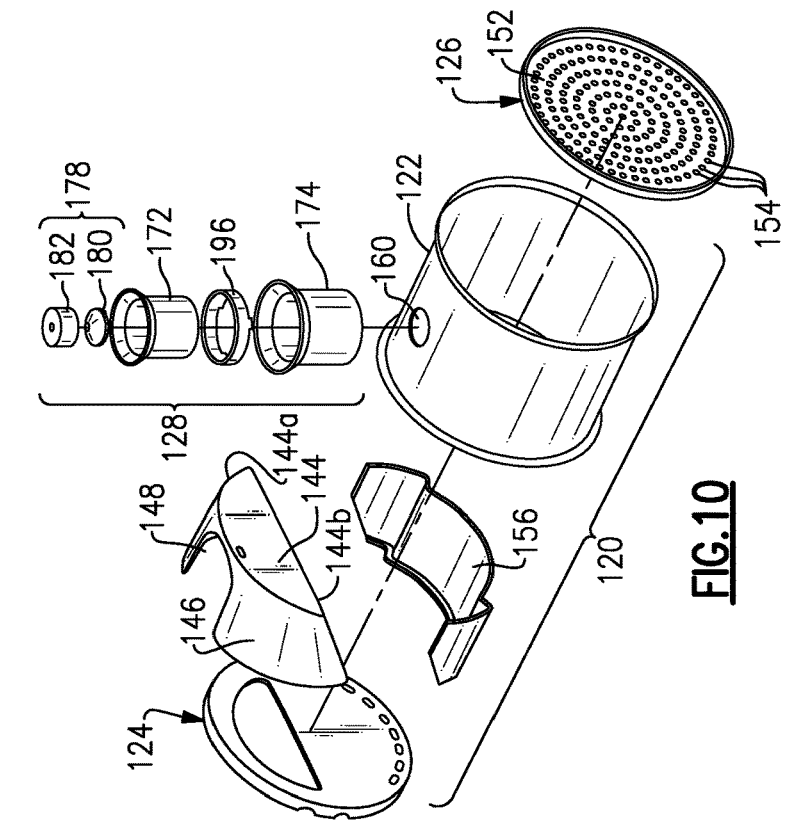
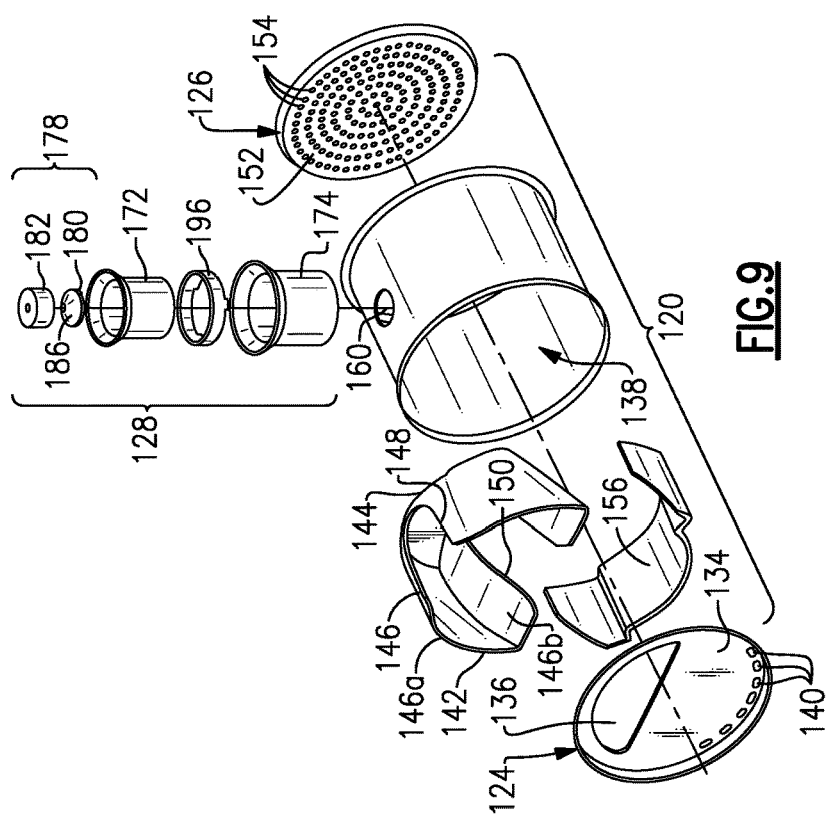

HIGH EFFICIENCY MIXER FOR VEHICLE EXHAUST SYSTEM

BACKGROUND OF THE INVENTION

An exhaust system conducts hot exhaust gases generated by an engine through various exhaust components to reduce emissions and control noise. The exhaust system includes an injection system that injects a diesel exhaust fluid (DEF), or a reducing agent such as a solution of urea and water for example, upstream of a selective catalytic reduction (SCR) catalyst. A mixer is positioned upstream of the SCR catalyst and mixes engine exhaust gases and products of urea transformation. The injection system includes a doser that sprays the urea into the exhaust stream. The urea should be transformed as much as possible into ammonia ($NH_3$) before reaching the SCR catalyst. Thus, the droplet spray size plays an important role in reaching this goal.

The industry is moving towards providing more compact exhaust systems, which results in reduced volume of the system. Systems that spray larger size droplets may not be able to provide adequate transformation of urea when used in more compact system configurations. As such, smaller droplet size dosers are required for these more compact configurations.

The smaller the droplet size, the more effective the transformation into ammonia is, due to the increased surface contact area. However, the spray generated by small droplet dosers is very sensitive to recirculation flow. Typically, an area located at a tip of the doser has a vortex of recirculating flow. This vortex pushes the spray droplets towards the walls of the mixer and onto the tip of the doser, which creates deposit initiation sites. The deposits build up over time and can adversely affect system operation. For example, there may be a lower ammonia uniformity index, there may be an increased pressure drop across the mixer, or higher ammonia emissions during active diesel particulate filter (DPF) regeneration.

Additionally, mixers are being used in a wide variety of applications that have different mounting configurations. Providing a different mixer for each configuration raises cost. Having a mixer principle that addresses the issues set forth above in combination with a mixer assembly that can be easily adjusted to multiple different mounting arrangements would significantly reduce cost.

SUMMARY OF THE INVENTION

In one exemplary embodiment, a vehicle exhaust system includes an inlet module configured to receive engine exhaust gas and a mixer housing defining an internal cavity that receives engine exhaust gas from the inlet module. An injection component is positioned within the internal cavity and has a fluid inlet and a fluid outlet to direct injected fluid into the internal cavity to mix with the engine exhaust gas. The injection component defines an injection axis and includes an inner structure defining an inner gas flow path and an outer structure defining an outer gas flow path that is between the inner and outer structures and radially outward of the inner gas flow path to improve mixing at the fluid outlet. An outlet module is configured to direct a mixture of engine exhaust gas and fluid to a downstream exhaust component.

In a further embodiment of the above, the inlet module comprises an inlet outer housing defining an inlet axis and having a first enclosed end that is associated with an upstream end of the mixer housing, and wherein the outlet module comprises an outlet outer housing defining an outlet axis and having a second enclosed end that is associated with the downstream end of the mixer housing, and wherein the inlet and outlet axes are non-coaxial.

In a further embodiment of any of the above, the first enclosed end includes a mount to receive an injector that injects fluid along an injection axis that extends from the first enclosed end toward the second enclosed end.

In a further embodiment of any of the above, the second enclosed end comprises an elongated concave shape that generates a double swirl within the outlet module.

In a further embodiment of any of the above, the inner structure comprises a swirl cone and the outer structure comprises at least one tube, and wherein the swirl cone is positioned radially inward of the tube.

In a further embodiment of any of the above, the at least one tube comprises an inner tube surrounded by an outer tube, and wherein the swirl cone is positioned radially inward of the inner tube.

In another exemplary embodiment, a vehicle exhaust component assembly includes an inlet module to receive engine exhaust gas and an injection component coupled to the inlet module and defining an injection axis. The injection component has a fluid inlet and a fluid outlet to direct injected fluid to mix with the engine exhaust gas from the inlet module. The injection component includes an inner tube to define an inner gas flow path that concentrates injected fluid in a central region of the injection component, and an outer tube radially outward of the inner tube and defining an outer gas flow path that is between the inner and outer tubes and radially outward of the inner gas flow path to improve mixing at the fluid outlet. An outlet module is configured to direct a mixture of engine exhaust gas and fluid to a downstream exhaust component.

In a further embodiment of any of the above, the injection component includes a swirl cone surrounding the injection axis, wherein the inner tube is radially outward of the swirl cone to define the inner gas flow path, and a mixer housing defines a mixer central axis and provides an internal cavity, and wherein the inner and outer tubes are positioned within the internal cavity, and including an inlet baffle attached to an upstream end of the mixer housing and a downstream baffle connected to a downstream end of the mixer housing such that the module inlet and outlet are coaxial with the mixer central axis.

In a further embodiment of any of the above, the inlet baffle comprises a plate extending across the upstream end of the mixer housing and having at least one primary opening through which a major portion of the exhaust gas enters the internal cavity and a plurality of secondary openings through which a remaining portion of the exhaust gas enters the internal cavity, and including an inlet manifold enclosed within the mixer housing and comprising an end wall portion that faces the primary opening and a circumferential wall portion extending at least partially around the end wall portion to form a first volume defined between the inlet baffle, circumferential wall portion, and the end wall portion, wherein the first volume comprises the inlet module.

In a further embodiment of any of the above, the outlet baffle comprises a plate extending across the downstream end of the mixer housing and having a plurality of openings through which a mixture of fluid and exhaust gas exits the mixer housing, and including an inner wall positioned within the mixer housing to face an outlet end of the outer pipe, and wherein a second volume defined between the inlet manifold, the inlet baffle, the inner wall, and the outlet baffle comprises the outlet module.

These and other features of this application will be best understood from the following specification and drawings, the following of which is a brief description.

BRIEF DESCRIPTION OF THE DRAWINGS

FIG. 8 is example of another embodiment of a mixer having coaxial inlet and outlet modules.

FIG. 9 is an exploded view of the mixer of FIG. 8 as viewed from one side of the mixer.

FIG. 10 is an exploded view of the mixer of FIG. 8 as viewed from an opposite side of the mixer.

DETAILED DESCRIPTION

Figure 1:
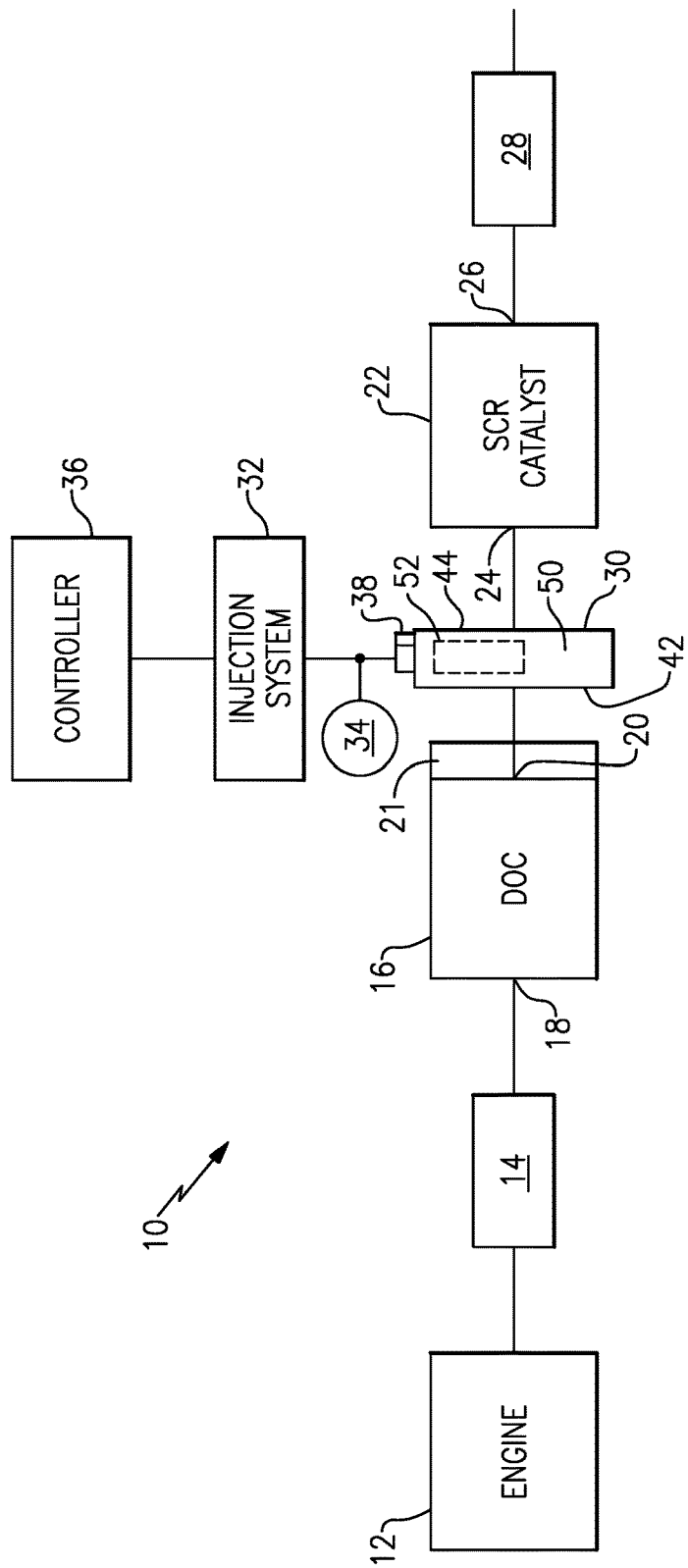
FIG. 1 schematically illustrates one example of an exhaust system with a mixer according to the subject invention.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, filters, valves, catalysts, mufflers etc.

In one example configuration, the upstream exhaust components 14 direct engine exhaust gases into a diesel oxidation catalyst (DOC) 16 having an inlet 18 and an outlet 20. Downstream of the DOC 16 there may be a diesel particulate filter (DPF) 21 that is used to remove contaminants from the exhaust gas as known. Downstream of the DOC 16 and optional DPF 21 is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space.

A mixer 30 is positioned downstream from the outlet 20 of the DOC 16 or DPF 21 and upstream of the inlet 24 of the SCR catalyst 22. The upstream catalyst and downstream catalyst can be in-line or in parallel. The mixer 30 is used to generate a swirling or rotary motion of the exhaust gas.

An injection system 32 is used to inject a reducing agent, such as a solution of urea and water for example, into the exhaust gas stream upstream from the SCR catalyst 22 such that the mixer 30 can mix the urea and exhaust gas thoroughly together. The injection system 32 includes a fluid supply 34, a doser 36, and a controller 38 that controls injection of the urea as known.

The mixer 30 comprises a mixer body having an inlet or upstream end 42 configured to receive the engine exhaust gases and an outlet or downstream end 44 to direct a mixture of swirling engine exhaust gas and products transformed from urea to the SCR catalyst 22. The mixer 30 defines an internal cavity 50 that receives engine exhaust gas and an injection component 52 is positioned within the internal cavity 50 to direct injected fluid into the internal cavity 50 to mix with the engine exhaust gas.

In one example configuration, an inlet module 46 (FIG. 2) has an inlet 48 configured to receive engine exhaust gas. The injection component 52 defines an injection axis and includes an inner structure defining an inner gas flow path that concentrates injected fluid in a central region of the injection component 52 and an outer structure defining an outer gas flow path that is between the inner and outer structures and radially outward of the inner gas flow path. This will be discussed in greater detail below. An outlet module 58 has an outlet 60 configured to direct a mixture of engine exhaust gas and fluid to a downstream exhaust component, for example the SCR catalyst 22.

Figure 2:
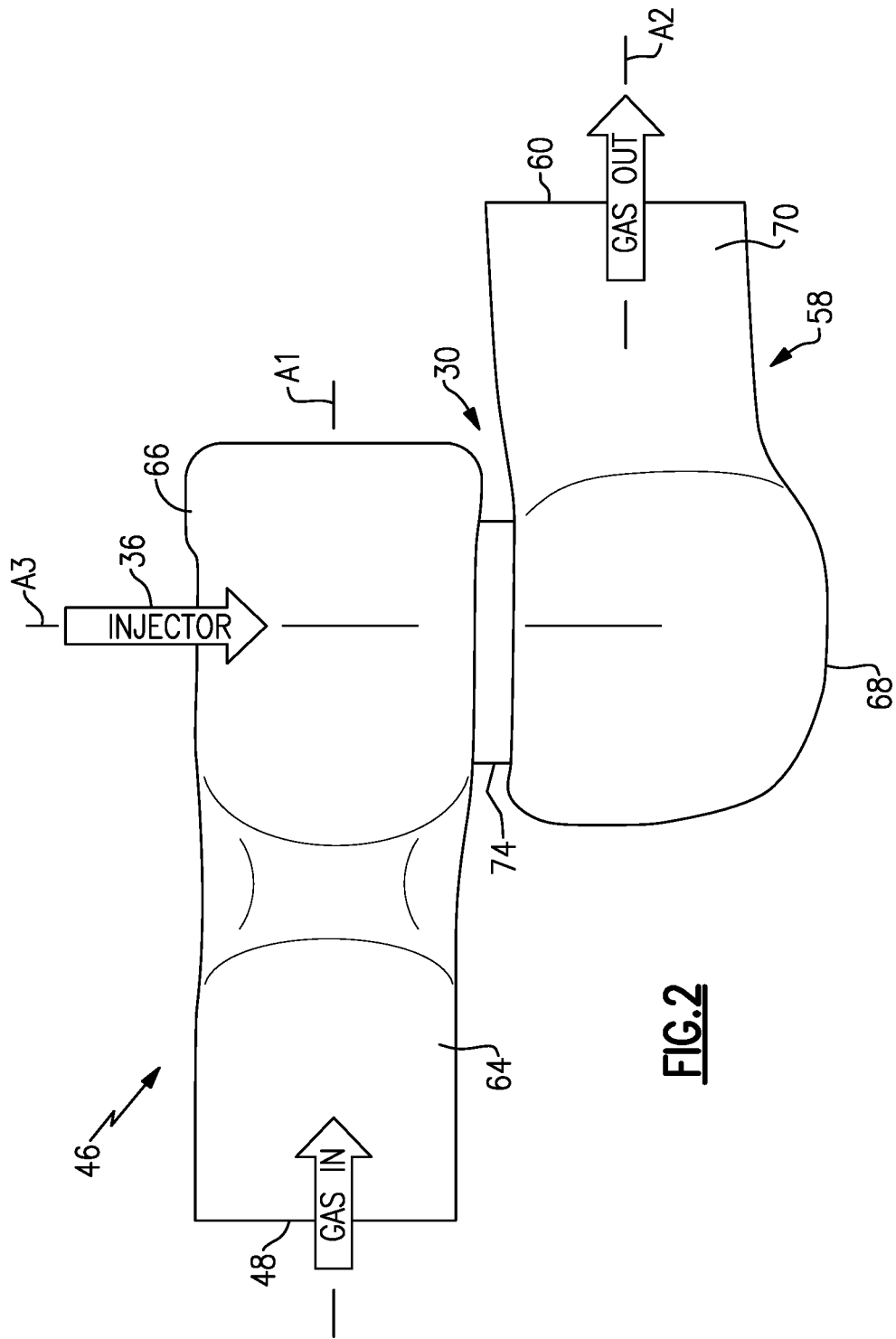
FIG. 2 is a side view of one example of a mixer having non-coaxial inlet and outlet modules.
Figure 3:
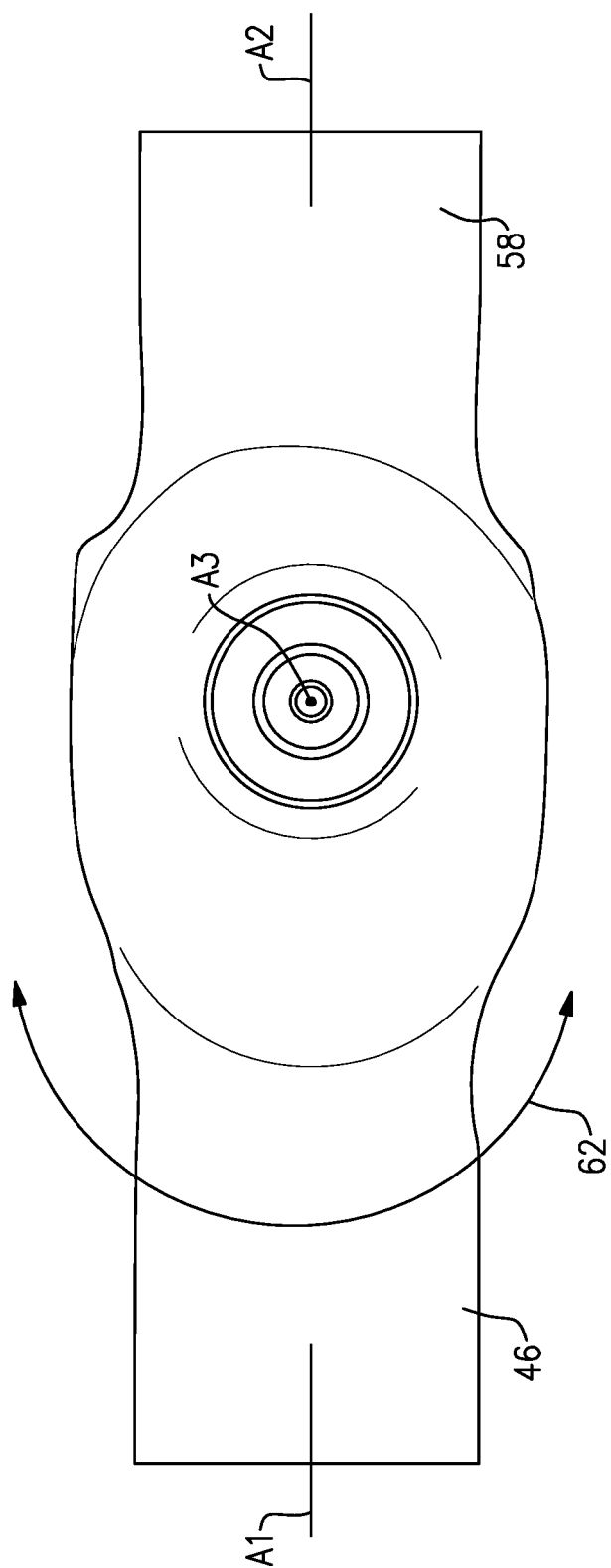
FIG. 3 is a top view of the mixer of FIG. 2.
Figure 4:
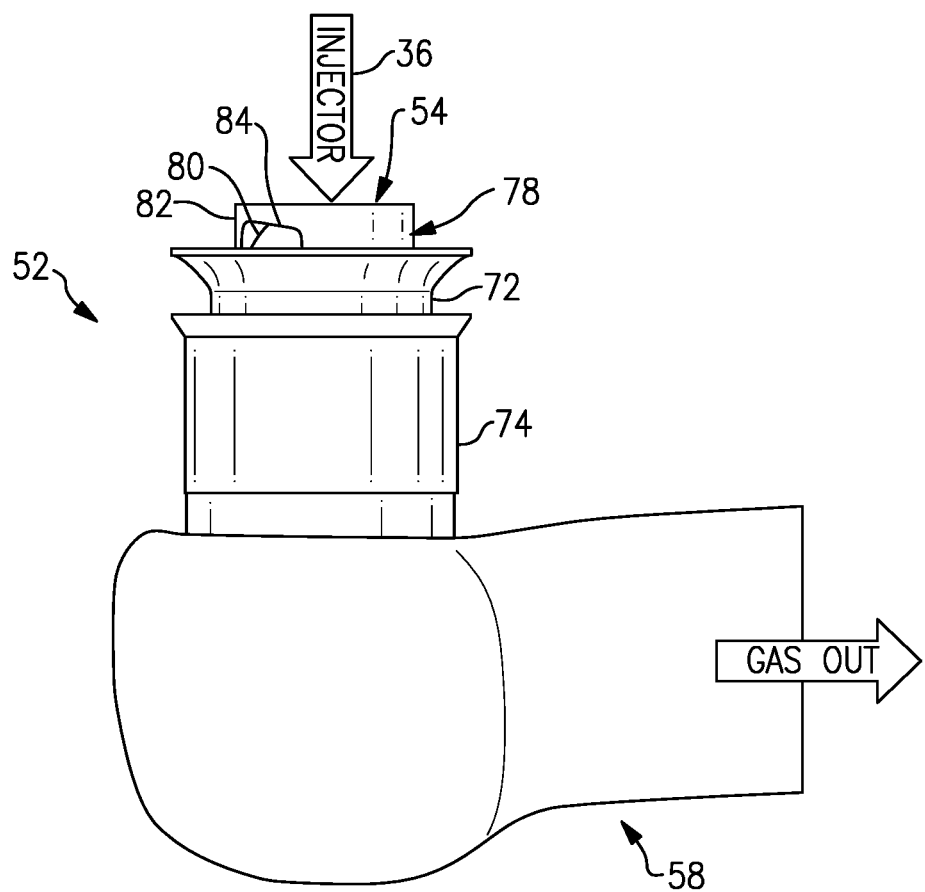
FIG. 4 is a side view of the mixer of FIG. 2 without the inlet module.
Figure 5:
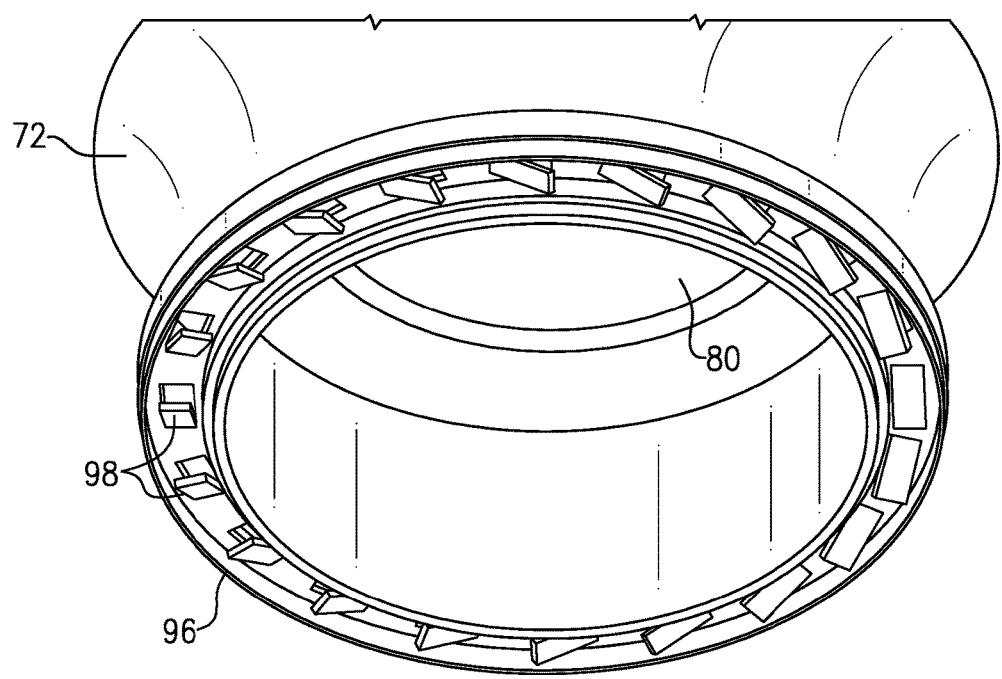
FIG. 5 is a perspective view of a mixing ring as used with the embodiment shown in FIG. 2.

FIGS. 2-7 shows a first example embodiment. FIG. 2 shows the inlet module 46 defining a first center axis A1 and the outlet module 58 defining a second center axis A2 that is parallel to and spaced apart from the first center axis A1. The doser or injector 36, which injects fluid into the inlet module 46, defines an injection axis A3. In this example, the injection axis A3 is perpendicular to the first A1 and second A2 center axes. The relative orientation of the inlet 46 and the outlet 58 modules can be adjusted by rotation in order to match a desired layout configuration without any impact on the performance of the mixer 30 as indicated by the arrow 62 in FIG. 3. Further, the orientation of the injection axis A3 can also be varied as needed.

Figure 6:
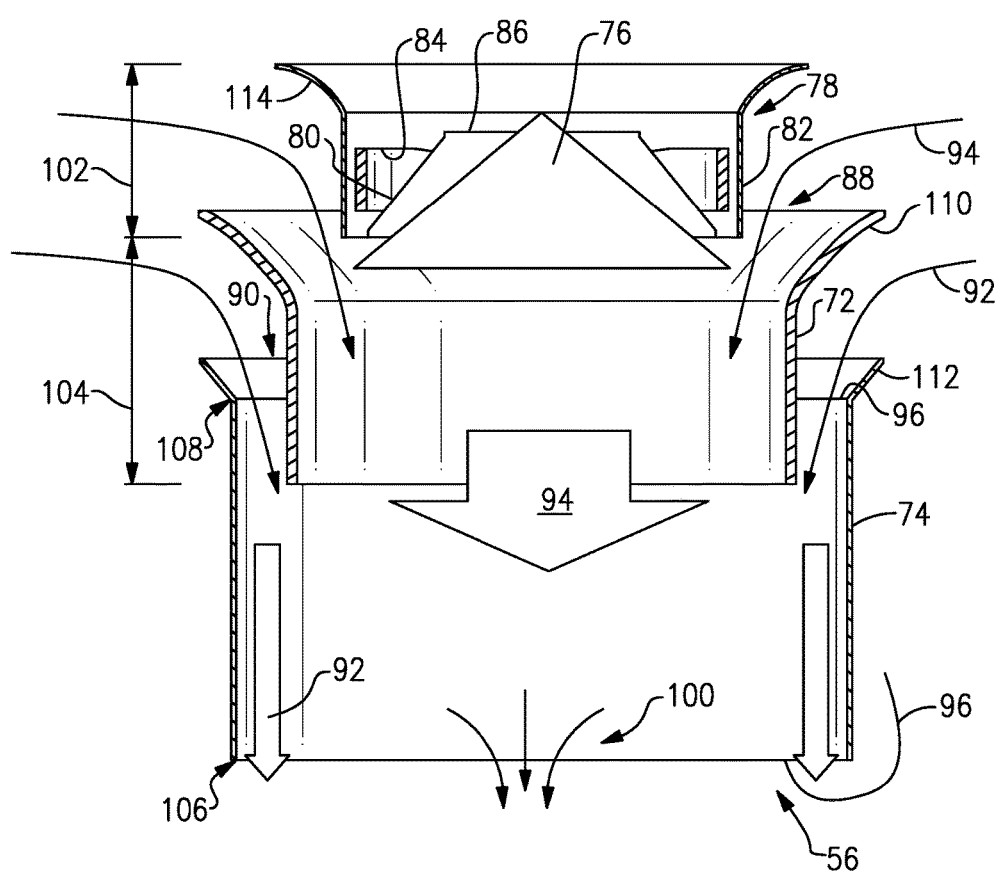
FIG. 6 is a side view of the injection component as used in the embodiment of FIG. 2.
Figure 7:
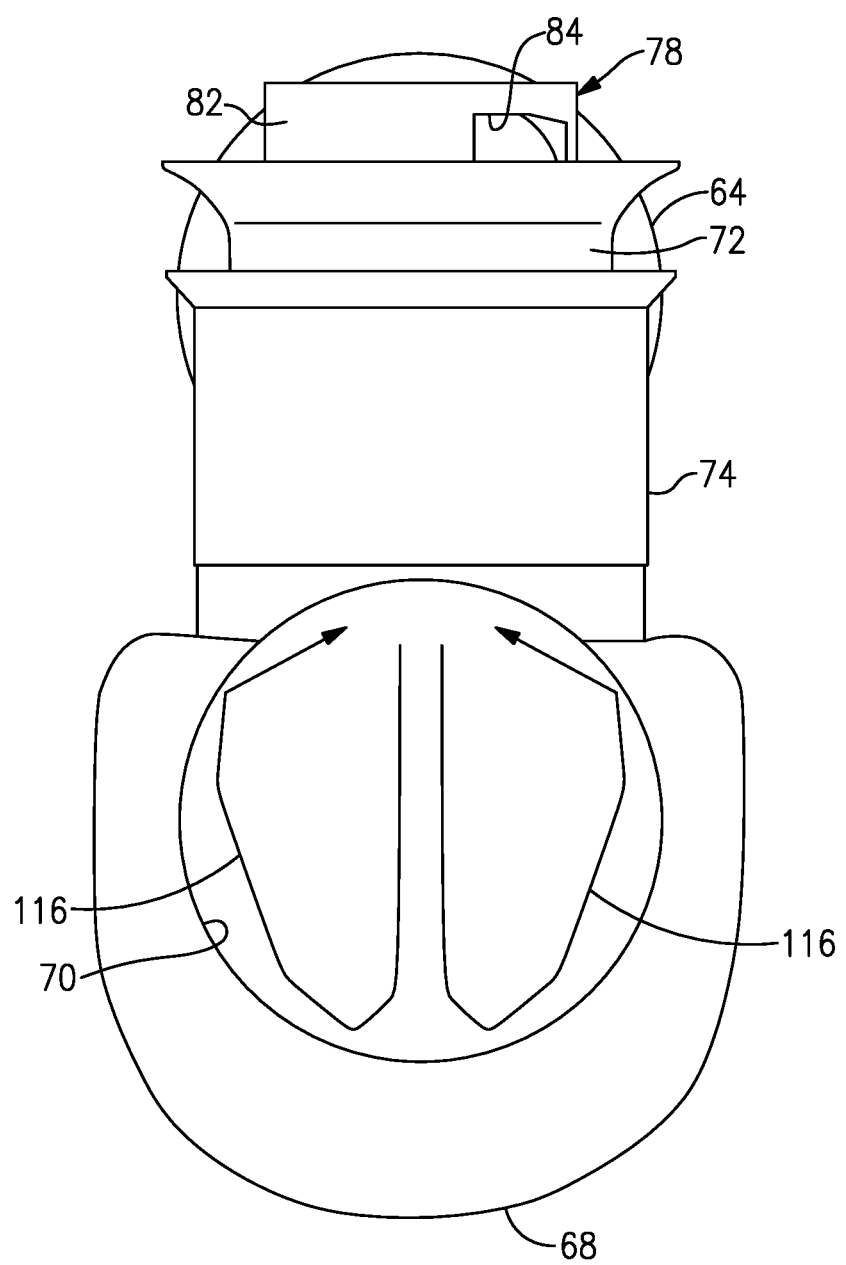
FIG. 7 is an end view of an outlet from the outlet module as used in the embodiment of FIG. 2.

In this example, the inlet module 46 comprises an outer housing with a straight inlet pipe portion 64 and an enclosed end portion 66 with a mount for the injector 36, and the outlet module 58 comprises an enclosed end portion 68 and a straight outlet pipe portion 70. The injection component 52 comprises a mixer assembly that is mounted to the inlet module 46 and the flow is split between an inner pipe 72 and an outer pipe 74 (FIG. 4) to allow a good control of injected fluid spray 76 (FIG. 6) and of the temperature of the pipe walls. In this example, a swirl cone 78 is positioned radially inward of the inner pipe 72 and includes an inner cone 80 and an outer swirl manifold 82 with one or more openings 84 as shown in FIG. 6. The openings 84 are configured to direct exhaust gas flow into an inlet end 86 of the inner cone 80. The swirl cone 78 controls the spray and reduces the risk of deposit in the injection area by creating a swirling flow around the injected spray. In one example, the swirl manifold 82 includes two openings 84 that are diametrically positioned opposite of each other to generate a swirl flow.

A first gap 88 is provided between the outer surface of the swirl manifold 82 and the inner surface of the inner pipe 72. A second gap 90 is provided between the outer surface of the inner pipe 72 and an inner surface of the outer pipe 74. The second gap 90 allows the creation of a gas layer or gas flow (indicated at arrow 92) on the outer pipe 74 to improve the evaporation of liquid film formed by spray impinging the wall and to control the temperature of the outer pipe 74. In order to adjust the evaporation, it is possible to modify the gap 90, e.g. radially increase or decrease the gap size, between the inner pipe 72 and the outer pipe 74 as needed. The swirl cone 78 directs flow toward a central region of the inner pipe 72. The first gap 88 allows gas flow 94 to concentrate the spray in the central region for mixing purposes. Thus, the gaps 88, 90 cooperate to control the behavior of the spray at the exit of the swirl cone 78 to improve mixing and reduce spray deposit formation. By using the inner 72 and outer 74 pipes to concentrate the flow around the swirl cone 78, the spray is controlled in the central area of the injection component 52.

The outer pipe 74 provides a single pipe connection to link the inlet module 46 to the outlet module 58 and to define the mixer internal cavity 50 that receives the injection component 52. This pipe 74 cooperates with the inner pipe 72 and swirl cone 78 to generate a flow mixture 100 of spray and exhaust gas exiting via the gaps 88, 90. The size of the pipe 74 (length and diameter) can be changed to adapt to a mass flow delivered by the engine 12 as well as a pressure drop target. Further, the relative positions of the swirl cone 78 versus the inner 72 and outer 74 pipes (as indicated at 102, 104 in FIG. 6) are adjustable in order to modulate the pressure drop of the system and the quantity of flow in the swirl cone 78 and between the pipes 72, 74.

In one example, a mixing ring 96 (FIG. 5) is located between the inner 72 and outer 74 pipe. The mixing ring 96 includes a plurality of tabs or louvers 98 that provide a plurality of openings in the ring to control exhaust gas flow through the second gap 90. The louvers 98 are configured to generate a swirling gas curtain within the second gap 90. In one example, the louvers 98 extend to distal ends that protrude outwardly from a downstream side of the mixing ring 96. This creates a plurality of openings that are circumferentially spaced apart from each other about the ring 96. In one example, the mixing ring 96 can be located at a downstream end of the gap 90 as indicated at 106 in FIG. 6. In another example, the mixing ring 96 can be located near an upstream end of the gap 90 at a location that is upstream from the outlet of the inner pipe 72 as indicated at 108 in FIG. 6. These mixing rings 96 can be used either alone or in combination with each other.

In one example, the inner tube 72 includes a flared portion 110 that provides for an increased area at the inlet end of the inner tube 72. The outer tube 74 also includes a flared portion 112 that provides for an increased area at the inlet end of the outer tube 74. The swirl manifold 82 may also include a flared portion 114. The flared portions 110, 112, 114 facilitate and control the exhaust gas flow into the cone 80 and gaps 88, 90.

The outlet module 58 is where a majority of the injection occurs. This outlet module 58 also receives any remaining spray, which was not evaporated in the injection component 52 and will evaporate it. In one example, the outlet module 58 comprises a spherical or elongated concave shape of the enclosed end portion 68 that limits the pressure drop as well as initiating turbulence to improve the mixing. This specific shape generates a double swirl at the outlet of the outlet model 58 to further improve the mixing as indicated at 116 in FIG. 7.

FIGS. 8-15 show another example embodiment for a compact mixer configuration. In this example, a mixer 120 includes an outer housing 122, an inlet baffle 124, an outlet baffle 126, and an injection component 128. As shown in FIG. 8, a first volume 130 in the mixer 120 comprises an inlet module and a second volume 132 comprises an outlet module.

FIGS. 9-10 show an exploded view of the mixer 120. The inlet baffle 124 comprises a plate 134 extending across an upstream end of the mixer housing 122 and which has at least one primary opening 136 through which a major portion of the exhaust gas enters an internal cavity 138 and a plurality of secondary openings 140 through which a remaining portion of the exhaust gas enters the internal cavity 138. An inlet manifold 142 is enclosed within the mixer housing 122 and comprises an end wall portion 144 that faces the primary opening 136 and a circumferential wall portion 146 extending at least partially around the end wall portion 144 to form the first volume 130 which is defined between the inlet baffle 124, circumferential wall portion 146, and the end wall portion 144. This first volume 130 comprises the inlet module.

In one example, the end wall portion 144 comprises a flat plate surface having a periphery defined by a curved outer edge portion 144*a* and a straight outer edge portion 144*b* (FIG. 10). In one example, the flat plate surface comprises a half circle shape. The circumferential wall portion 146 includes a curved wall 146*a* extending along the curved outer edge portion 144*a* and a straight wall 146*b* extending along the straight outer edge portion 144*b* (FIG. 9). In one example, the straight wall 146*b* extends at an oblique angle relative to a planar surface defined by the end wall portion 144.

The curved wall 146*a* includes an inlet slot or opening 148 that is associated with an inlet end of the injection component 128. The straight wall 146*b* includes an enlarged opening or slot 150 that is associated with a downstream end of the injection component 128.

The outlet baffle 126 comprises a plate 152 extending across a downstream end of the mixer housing 122. The plate 152 includes one or more openings 154 through which a mixture of fluid and exhaust gas exits the mixer housing 122. An inner wall 156 is positioned within the mixer housing 122 to face an outlet end of the injection component 128. The second volume 132 is defined between the inlet manifold 142, the inlet baffle 124, the inner wall 156, and the outlet baffle 126. The second volume 132 comprises the outlet module.

Figure 12:
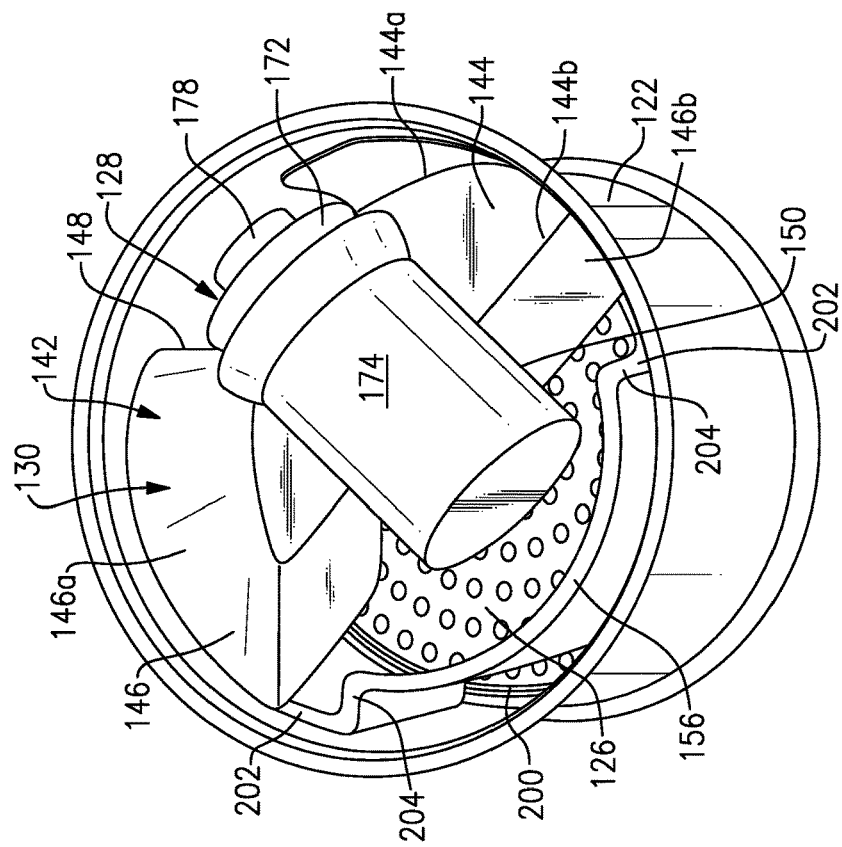
FIG. 12 similar to FIG. 11 but does not include the inlet baffle.

In one example, the injection component 128 comprises an inner pipe 172, an outer pipe 174, and a swirl cone 178 that is positioned radially inward of the inner pipe 172. As shown in FIG. 12, the inner pipe 172, outer pipe 174, and swirl cone 178 are enclosed within the mixer housing 122 at a location between the inlet 124 and outlet 126 baffles. The swirl cone 178 includes an inner cone 180 and an outer swirl manifold 182 with one or more openings 184 similar to that shown in FIG. 6. The openings 184 are configured to direct exhaust gas flow into an inlet end 186 of the inner cone 180. The manifold 182 is received within an opening 160 formed within the mixer housing 122. The swirl cone 178 controls the spray and reduces the risk of deposit in the injection area by creating a swirling flow around the injected spray. In one example, the swirl manifold 182 includes two openings 184 that are diametrically positioned opposite of each other to generate a swirl flow.

A first gap 188 is provided between the outer surface of the swirl manifold 182 and the inner surface of the inner pipe 172. A second gap 190 is provided between the outer surface of the inner pipe 172 and an inner surface of the outer pipe 174. The second gap 190 allows the creation of a gas layer or gas flow (indicated at arrow 192) on the outer pipe 174 to improve the evaporation of liquid film formed by spray impinging the wall and to control the temperature of the outer pipe 174. In order to adjust the evaporation, it is possible to modify the gap 190, e.g. radially increase or decrease the gap size, between the inner pipe 72 and the outer pipe 74 as needed. The swirl cone 178 directs flow toward a central region of the inner pipe 172. The first gap 188 allows gas flow 194 to concentrate the spray in the central region for mixing purposes. Thus, the gaps 188, 190 cooperate to control the behavior of the spray at the exit of the swirl cone 178 to improve mixing and reduce spray deposit formation. By using the inner 172 and outer 174 pipes to concentrate the flow around the swirl cone 178, the spray is controlled in the central area of the injection component 128.

The configuration of the inner 172 and outer 174 pipes is similar to that described above with regard to the embodiment of FIGS. 2-7. Further, a mixing ring 196 located between the inner 172 and outer 174 pipes may optionally be included in any manner as described above. Optionally, instead of having a double pipe configuration 172, 174 a single pipe may be used in combination with the swirl cone 178.

Figure 11:
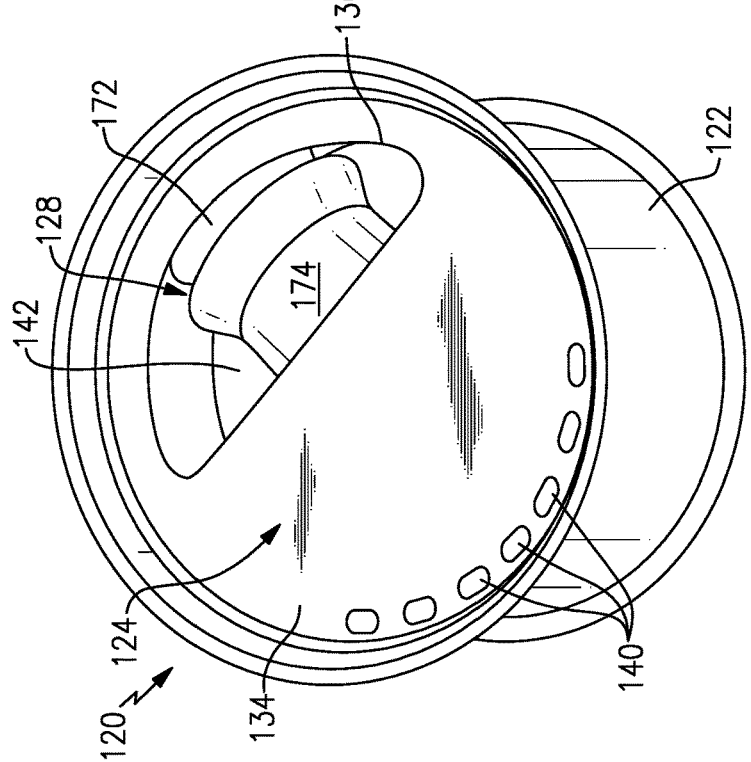
FIG. 11 is an inlet end view of the mixer of FIG. 9
Figure 13:
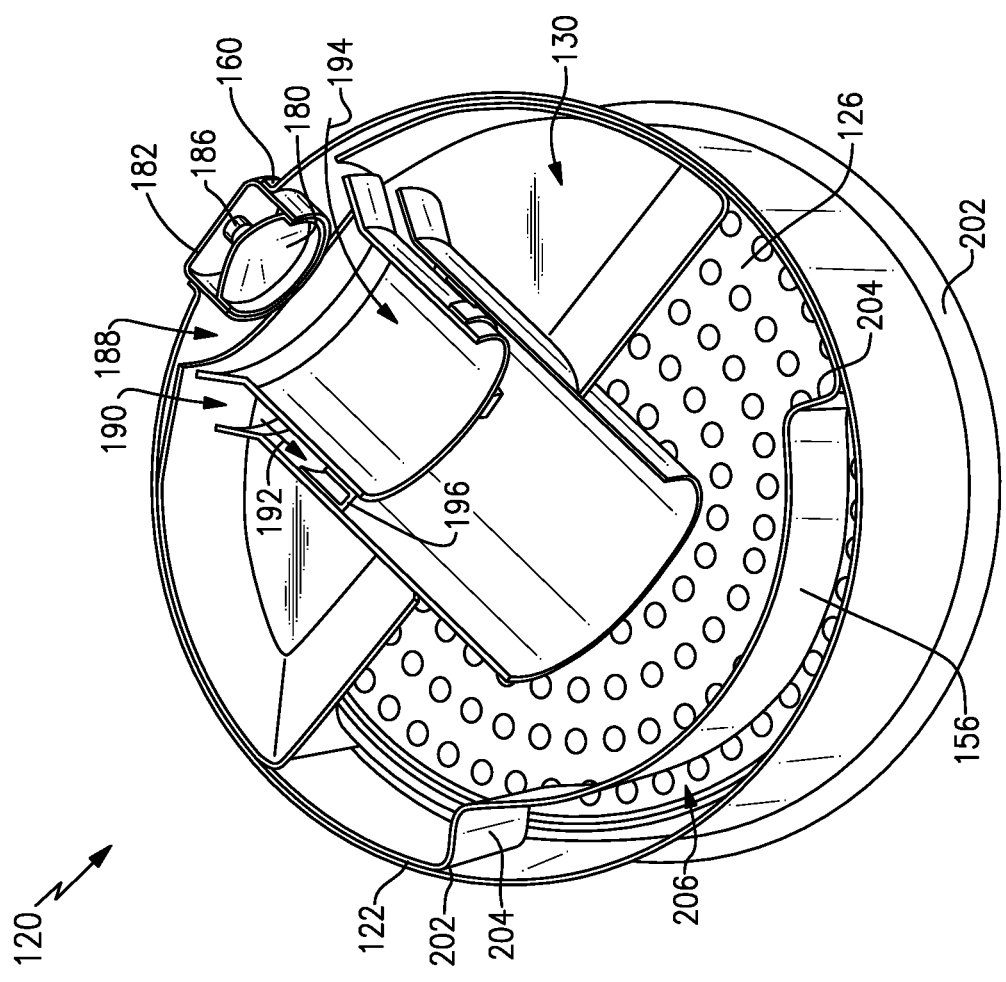
FIG. 13 is a section view of FIG. 12.

FIGS. 11-13 show an inlet end and first volume 130 of the mixer 120 in greater detail. As shown in FIG. 11, the primary opening 136 overlaps an inlet end of the injection component 128 to direct exhaust gas into the gaps 88, 90 (FIG. 6). In one example, the primary opening 136 comprises a single large opening having a half circle shape. The secondary openings 140 are located on an opposite edge of the inlet baffle 124 from the primary opening 136. As shown in FIG. 12, the inner wall 156 is spaced radially inward from an inner surface of the housing 122 by a gap 200. The secondary openings 140 direct exhaust gas into this gap 200 to heat the inner wall 156 to reduce spray deposit formation.

The inlet manifold 142 has an outer surface that is fixed to an inner surface of the housing 122. The inner wall 156 includes a pair of opposing distal edges 202 that are fixed to the inlet manifold 142 and/or mixer housing 122. A step portion 204 extends radially inwardly from each distal edge 202 such that the main portion of the inner wall 156 is spaced from the housing 122 to provide the gap 200. As shown in FIG. 12, the first volume 130 created between the inlet manifold 142 and the inlet baffle 124 is the inlet module.

Figure 15:
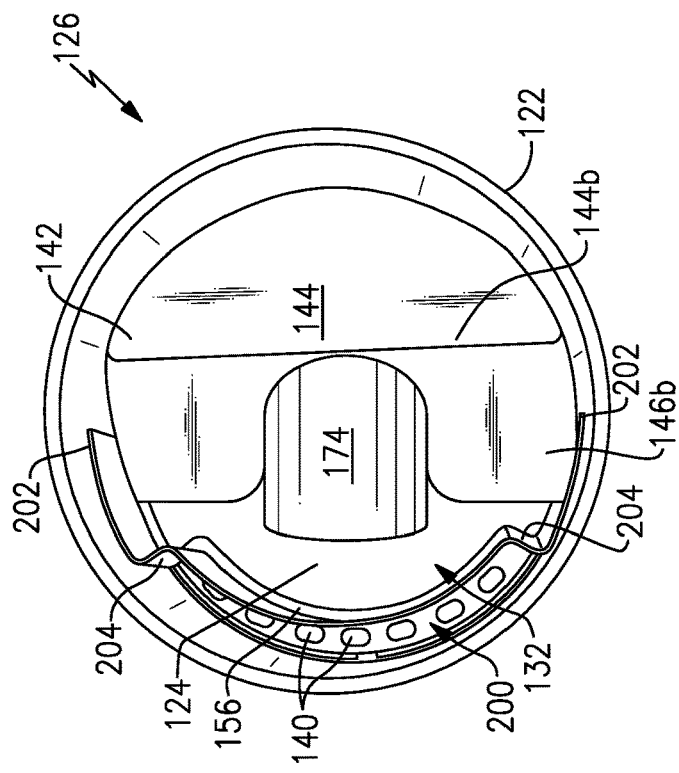
FIG. 15 similar to FIG. 14 but does not include the outlet baffle.
Figure 14:
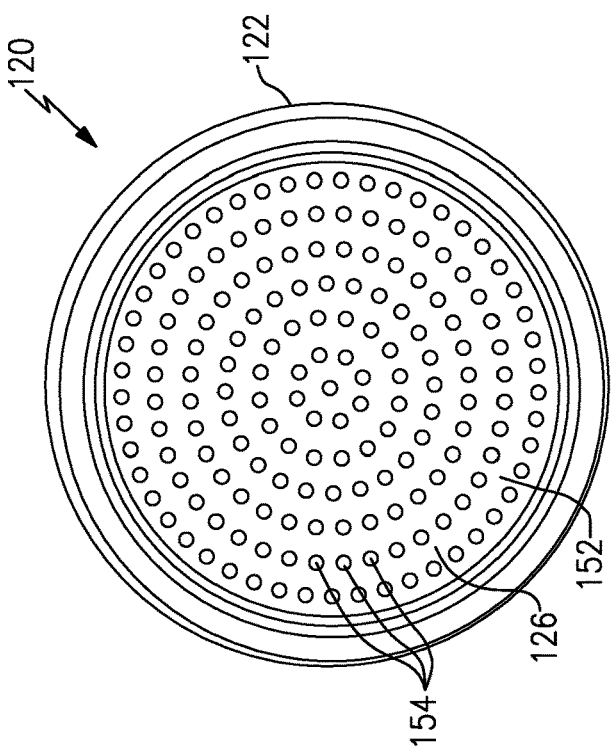
FIG. 14 is an outlet end view of the mixer of FIG. 9.

FIGS. 14-15 show an outlet end and second volume 132 of the mixer 120 in greater detail. FIG. 14 shows an end view of the outlet baffle 126 with the plurality of exit openings 154. In one example, the openings 154 are circumferentially spaced apart from each outer about the mixer central axis and form a series of circular row patterns that are spaced radially apart from each other relative to the mixer central axis. FIG. 15 shows that the second volume 132 created between the inlet manifold 142, the inlet baffle 124, the inner wall 156, and the outlet baffle 12 is the outlet module.

The subject invention provides a mixing configuration that generates a swirling exhaust flow to ensure thorough mixing of injected fluid with the exhaust gas prior to exiting the mixer. The double wall pipe configuration facilitates heating of the inner pipe to provide consistent temperature distribution along the injection path and to maintain the inner pipe at a high temperature to avoid deposit formation.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vehicle exhaust component assembly comprising:
an inlet module configured to receive engine exhaust gas;
a mixer housing defining an internal cavity that receives engine exhaust gas from the inlet module;
an injection component positioned within the internal cavity and having a fluid inlet and a fluid outlet to direct injected fluid into the internal cavity to mix with the engine exhaust gas, wherein the injection component defines an injection axis and includes an inner structure defining an inner gas flow path and an outer structure defining an outer gas flow path that is between the inner and outer structures and radially outward of the inner gas flow path to improve mixing at the fluid outlet;
wherein the outer structure comprises at least one tube and the inner structure comprises a swirl cone that extends upstream of the at least one tube, and wherein the swirl cone is positioned radially inward of the at least one tube; and
an outlet module configured to direct a mixture of engine exhaust gas and fluid to a downstream exhaust component.

2. The vehicle exhaust component assembly according to claim 1, wherein the mixer housing defines a mixer central axis that is non-parallel with the injection axis, and wherein the inlet module and outlet module are coaxial with the mixer central axis.

3. The vehicle exhaust component assembly according to claim 1, wherein the inlet module comprises an inlet outer housing defining an inlet axis and having a first enclosed end that is associated with an upstream end of the mixer housing, and wherein the outlet module comprises an outlet outer housing defining an outlet axis and having a second enclosed end that is associated with a downstream end of the mixer housing, and wherein the inlet and outlet axes are non-coaxial.

4. The vehicle exhaust component assembly according to claim 3, wherein the first enclosed end includes a mount to receive an injector that injects fluid along the injection axis that extends from the first enclosed end toward the second enclosed end.

5. The vehicle exhaust component assembly according to claim 3, wherein the second enclosed end comprises an elongated concave shape that generates a double swirl within the outlet module.

6. The vehicle exhaust component assembly according to claim 1, wherein the at least one tube comprises an inner tube surrounded by an outer tube, and wherein the swirl cone is positioned radially inward of the inner tube.

7. The vehicle exhaust component assembly according to claim 6, including a mixing ring positioned between the outer tube and the inner tube.

8. The vehicle exhaust component assembly according to claim 6, wherein the mixer housing comprises the outer tube such that the outer tube directly connects the inlet and outlet modules together, and wherein the inner tube concentrates injected fluid in a central region of the injection component, and wherein the outer tube generates a gas layer between the inner and outer tubes to improve evaporation and mixing.

9. The vehicle exhaust component assembly according to claim 8, wherein the swirl cone comprises an internal cone and an outer wall surrounding the internal cone.

10. The vehicle exhaust component assembly according to claim 1, including a mount opening configured to receive an injector that injects the fluid, and wherein the swirl cone includes an inlet end that is positioned at the mount opening.

11. The vehicle exhaust component assembly according to claim 1, including an inlet baffle and an inlet manifold, the inlet baffle comprising a plate extending across the upstream end of the mixer housing and having at least one primary opening through which a major portion of the exhaust gas enters the internal cavity and a plurality of secondary openings through which a remaining portion of the exhaust gas enters the internal cavity, and wherein the inlet manifold is enclosed within the mixer housing and comprises an end wall portion that faces the primary opening and a circumferential wall portion extending at least partially around the end wall portion to form a volume defined between the inlet baffle, circumferential wall portion, and the end wall portion, and wherein the volume comprises the inlet module.

12. The vehicle exhaust component assembly according to claim 11, wherein the end wall portion comprises a flat surface having a curved outer edge portion and a straight outer edge portion, and wherein the circumferential wall portion includes a curved wall extending along the curved outer edge portion and a straight wall extending along the straight outer edge portion, and wherein the straight wall extends at an oblique angle relative to the flat surface.

13. The vehicle exhaust component assembly according to claim 12, wherein the curved wall includes an inlet opening that is associated with the inner structure, and wherein the straight wall includes an enlarged slot that is associated with a downstream end of the outer structure.

14. The vehicle exhaust component assembly according to claim 11, including
an outlet baffle comprising a plate extending across the downstream end of the mixer housing and having one or more openings through which a mixture of fluid and exhaust gas exits the mixer housing, and
an inner wall positioned within the mixer housing to face an outlet end of the outer structure, and wherein a volume defined between the inlet manifold, the inlet baffle, the inner wall, and the outlet baffle comprises the outlet module.

15. A vehicle exhaust component assembly comprising:
an inlet module configured to receive engine exhaust gas;
an injection component defining an injection axis, the injection component having a fluid inlet and a fluid outlet to direct injected fluid to mix with the engine exhaust gas from the inlet module, wherein the injection component includes
an inner tube to define an inner gas flow path that concentrates injected fluid in a central region of the injection component, and
an outer tube radially outward of the inner tube and defining an outer gas flow path that is between the inner and outer tubes and radially outward of the inner gas flow path to improve mixing at the fluid outlet;
a swirl cone that extends upstream of the inner and outer tubes, and wherein the swirl cone is positioned radially inward of the inner tube such that at least an outlet end of the swirl cone is surrounded by the inner tube; and
an outlet module configured to direct a mixture of engine exhaust gas and fluid to a downstream exhaust component.

16. The vehicle exhaust component assembly according to claim 15, wherein the swirl cone surrounds the injection axis, and wherein the inner tube is radially outward of the swirl cone to define the inner gas flow path, and wherein the inlet module defines an inlet axis and includes an inlet housing that is directly attached to an upstream end of the outer tube and wherein the outlet module defines an outlet axis and includes an outlet housing that is directly attached to a downstream end of the outer tube, and wherein the inlet and outlet axes are spaced apart and parallel with each other and are non-parallel with the injection axis.

17. A vehicle exhaust component assembly comprising:
an inlet module configured to receive engine exhaust gas;
an injection component defining an injection axis, the injection component having a fluid inlet and a fluid outlet to direct injected fluid to mix with the engine exhaust gas from the inlet module, wherein the injection component includes
an inner tube to define an inner gas flow path that concentrates injected fluid in a central region of the injection component, and
an outer tube radially outward of the inner tube and defining an outer gas flow path that is between the inner and outer tubes and radially outward of the inner gas flow path to improve mixing at the fluid outlet;
an outlet module configured to direct a mixture of engine exhaust gas and fluid to a downstream exhaust component, and
a swirl cone surrounding the injection axis, wherein the inner tube is radially outward of the swirl cone to define the inner gas flow path, and including a mixer housing defining a mixer central axis and providing an internal cavity, and wherein the inner and outer tubes are positioned within the internal cavity, and including an inlet baffle attached to an upstream end of the mixer housing and a downstream baffle connected to a downstream end of the mixer housing such that the inlet module and outlet module are coaxial with the mixer central axis.

18. The vehicle exhaust component assembly according to claim 17, wherein the inlet baffle comprises a plate extending across the upstream end of the mixer housing and having at least one primary opening through which a major portion of the exhaust gas enters the internal cavity and a plurality of secondary openings through which a remaining portion of the exhaust gas enters the internal cavity, and including an inlet manifold enclosed within the mixer housing and comprising an end wall portion that faces the primary opening and a circumferential wall portion extending at least partially around the end wall portion to form a first volume defined between the inlet baffle, circumferential wall portion, and the end wall portion, wherein the first volume comprises the inlet module.

19. The vehicle exhaust component assembly according to claim 18, wherein the outlet baffle comprises a plate extending across the downstream end of the mixer housing and having a plurality of openings through which a mixture of fluid and exhaust gas exits the mixer housing, and including an inner wall positioned within the mixer housing to face an outlet end of the outer pipe, and wherein a second volume defined between the inlet manifold, the inlet baffle, the inner wall, and the outlet baffle comprises the outlet module.

20. The vehicle exhaust component assembly according to claim 15, including a mount opening configured to receive an injector that injects the fluid, and wherein the swirl cone includes an inlet end that is positioned at the mount opening, and wherein the mount opening is in a mixer housing or an inlet module housing that is associated with the injection component.

21. The vehicle exhaust component assembly according to claim 15, including a swirl manifold that surrounds the swirl cone, wherein the swirl manifold is positioned radially inward of the inner tube and radially outward of the swirl cone.

22. The vehicle exhaust component assembly according to claim 21, wherein the swirl manifold includes one or more openings that are configured to direct exhaust gas flow into an inlet end of the swirl cone.

23. The vehicle exhaust component assembly according to claim 1, wherein a mount opening configured to receive an injector that injects the fluid is located in the mixer housing or an inlet module housing.

24. The vehicle exhaust component assembly according to claim 1, including a swirl manifold that surrounds the swirl cone, wherein the swirl manifold is positioned radially inward of the at least one tube and radially outward of the swirl cone.

25. The vehicle exhaust component assembly according to claim 24, wherein the swirl manifold includes one or more openings that are configured to direct exhaust gas flow into an inlet end of the swirl cone.

\* \* \* \* \*

UNITED STATES PATENT AND TRADEMARK OFFICE
CERTIFICATE OF CORRECTION

PATENT NO. : 10,316,721 B1  
APPLICATION NO. : 15/959515  
DATED : June 11, 2019  
INVENTOR(S) : Julien Moulieres, Eduardo Alano and Laurent Poinsot Page 1 of 1

It is certified that error appears in the above-identified patent and that said Letters Patent is hereby corrected as shown below:

In the Claims

In Claim 11, Column 9, Line 5; replace "the upstream end" with --an upstream end--

In Claim 14, Column 9, Line 32-33; replace "the downstream end" with --a downstream end--

In Claim 19, Column 10, Line 52; replace "the outlet baffle" with --the downstream baffle--

In Claim 19, Column 10, Line 57; replace "the outer pipe" with --the outer tube--

In Claim 19, Column 10, Line 59; replace "the outlet baffle" with --the downstream baffle--

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*